Patented June 26, 1934

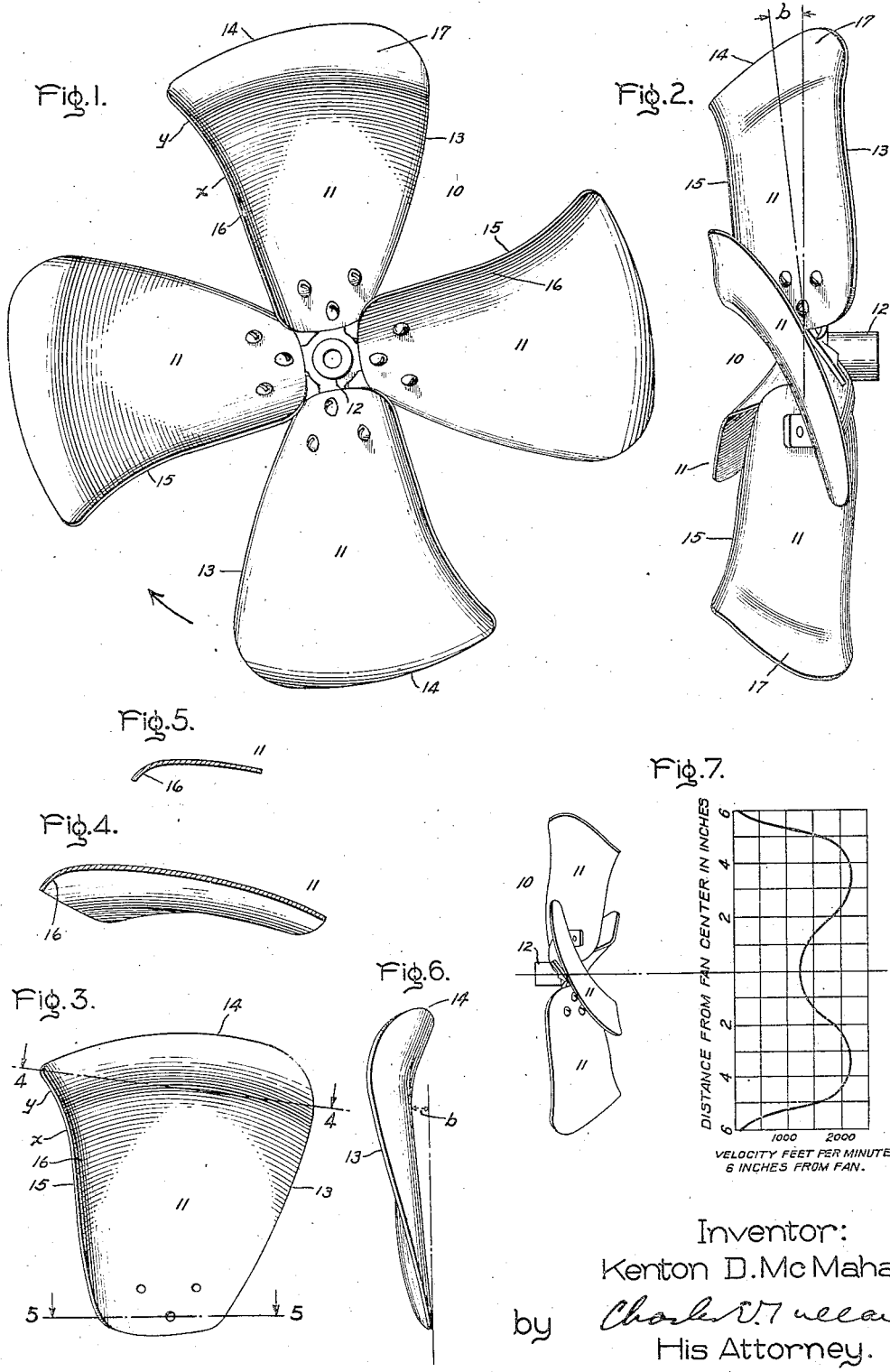
Inventor:
Kenton D. McMahan,
His Attorney.

1,964,525

UNITED STATES PATENT OFFICE 1,964,525

FAN BLADE

Kenton D. McMahan, Schenectady, N. Y., assignor to General Electric Company, a corporation of New York Application July 30, 1932, Serial No. 626,600

13 Claims. (Cl. 170—159)

My invention relates to fans and more particularly to a special form of fan blade.

Recently considerable attention has been directed to the noise incidental to the operation of fans. This may be explained by the increased use and application of fans or possibly by the general increase in the consideration of noise as an objectionable feature of all mechanical devices especially those used in the home. While there are a number of factors contributing to the noise produced in the operation of the fan it has been found that the abrupt change in the velocity of the air caused by the action of the fan is the source of much of the noise. This abrupt change in velocity or rapid acceleration of the air is in a measure essential to the attainment of a high output velocity. The elements which determine the rate of air acceleration in any particular fan are the maximum velocity imparted to the air and the blade width. It would be a simple problem to reduce this source of noise by increasing the blade width if it were not for the fact that most fan blades are not efficient throughout their whole surface in their operation on the air and so a mere increase in the width of the fan blade would not be a sure method of reducing the noise because there would not be any certainty that the full blade width would be efficient in operating on the air. In other words, in the usual type of fan the portion of the blade width effective in the acceleration of the air is considerably less than the actual blade width. Obviously for any given blade width the acceleration is increased with the increase in the maximum velocity. It has been found experimentally that the noise produced by any fan within the normal operating range of speeds (500 to 1725 R. P. M.) regardless of number of blades, shape of blades, pitch, or speed, is determined by the maximum velocity imparted to the air near the fan and the effective blade width in accordance with the following equation, where the effective blade width is determined by the length of the path across a single blade along which the air particles travel that enter the zone of maximum velocity:

$$\text{Noise} = k_1 \frac{\text{maximun velocity}}{\sqrt{\text{effective blade width}}} + k_2.$$

$k_1$ and $k_2$ are constants depending upon the units in which noise, velocity and blade width are measured. Therefore, the noise incident to the operation of a fan may be reduced only by a reduction of maximum velocity or an increase in the effective blade width. It has also been observed in the operation of the usual type of fan that the discharge air stream directly in front of the fan has a considerably smaller diameter than the diameter of the fan due to the inward momentum of the air entering the fan from the sides. This contraction of the air stream contributes to the production of a high maximum velocity, and a bad velocity distribution in the discharge air stream with a resultant decrease of air flow for a given maximum velocity. It is then apparent that the noise of a fan for a given air output may be reduced by the reduction of maximum velocity through the production of a more uniform velocity distribution, and the use of a blade whose effective width is as great as possible.

The object of my invention is to provide a fan with an improved blade which makes it possible to obtain a better velocity distribution and thus a reduction of maximum velocity for a desired air output with the incident noise reduction. A further object of my invention is to provide a blade which has an effective width substantially equal to its physical width.

The noise produced by my fan is a minimum because the surface of the blade has been so shaped that, first, the velocity distribution across the fan diameter is practically uniform, while at the same time the diameter of the discharge air stream near the fan is substantially equal to the fan diameter, and, second, the full blade width is utilized in its action upon the air.

What I consider to be novel and my invention will be better understood by reference to the following specification and appended claims when considered in connection with the accompanying drawing.

In the drawing, Fig. 1 is a plan view of a fan having four blades of my improved construction; Fig. 2 is a side view of the fan shown in Fig. 1; Fig. 3 is a plan view of one of my improved blades; Fig. 4 is a sectional view along the line 4—4 of Fig. 3 looking in the direction indicated by the arrows; Fig. 5 is a sectional view along 5—5 of Fig. 3 looking in the direction indicated by the arrows; Fig. 6 is a side view of the blade of Fig. 3 looking from the right of the blade, and Fig. 7 is a side view of the fan similar to Fig. 2 with a curve showing the velocity distribution of the air impelled by the fan at 6" from it.

Referring to the drawing, 10 indicates generally a fan having four blades 11 of identical construction secured to a hub or spider 12. Blades 11 are spaced equally around the circumference of the fan as is the usual practice. It is to be understood that my invention may be utilized in a fan having any desired number of blades and it is not limited in its use to a four blade fan. In Fig. 1 the plan view of the fan shows the blades foreshortened due to the pitch of the blades with respect to the plane of rotation of the fan and the true contour of the blades is better indicated in Fig. 3 in which one of the blades is shown in plan view. The edge of blade 11, designated by the numeral 13, is called the leading edge of the blade because it is the forward edge of the blade in the normal rotation of the fan in a clockwise direction as indicated by the arrow in Fig. 1. This leading edge 13 is slightly curved but extends substantially parallel to a radial line extending from the center of the hub. The outer peripheral edge 14 of the blade is arcuate. Edge 15 is the so-called trailing edge of the blade. As shown in Fig. 1 the peripheral edge 14 of the blade extends a greater distance from the center of the fan near the leading edge 13 than it does at the trailing edge 15. The purpose of providing a peripheral edge 14 that decreases in radial extent from the leading edge 13 to the trailing edge 15 is to prevent air from being picked up by the peripheral edge intermediate the leading and trailing edges which air would otherwise be acted upon by only a portion of the blade width. Such action of a peripheral edge of constant radial extent has been observed from spray tests and is due to the inward momentum of the air before it can be counteracted by the action of the fan.

Trailing edge 15 extends substantially parallel to a radial line through the center of the hub from its inner end to a point $x$ a little more than two-thirds of the radial extent of the blade. Beyond point $x$ it curves rearwardly with respect to the direction of rotation of the fan as indicated at $y$. In other words, the trailing edge 15 approximates the form of an involute curve. The purpose of the shape of this trailing edge may be better understood by a consideration of the action of a fan in imparting velocity to the air projected by it. The area behind a fan is exactly equal to the area in front of a fan yet when the fan is operating the air propelled throughout the area of the fan has substantially higher velocity in front of the fan than it has behind the fan. Thus, the actual input area behind the fan must be greater than the output area in front of the fan because the fluid is not perceptibly compressed by the action of the fan. This means that much of the air must be taken into the fan at a greater radial extent from the center of rotation of the fan than the outer periphery of the blades. In other words, the fan is situated in the midst of a funnel or cone-shaped column of moving air. Thus much of the air which enters into the fan has an inward momentum toward the center of rotation due to the fact that it has been drawn into the fan at a greater radial distance behind the fan than the radial extent of the peripheral edges of the blade. Thus, if this inward momentum of the air is not counteracted it will follow a path across the blade which is directed inwards so that it makes an angle with a circular arc of constant radius drawn about the fan axis. This inward air flow produces a contraction of the discharge air stream and a peak velocity at some distance in from the outer periphery of the blade. A high peak velocity is objectionable because it means a more rapid acceleration of the air to obtain such a high velocity. As pointed out above the higher the acceleration the greater the noise produced by the fan. Thus, the purpose of the shape of this trailing edge is to counteract, at least in a measure, the inward momentum of the air entering the fan at a greater radial distance from the center of rotation than the radial extent of the outer periphery of the blades to prevent the usual contraction of the output air stream and produce a better velocity distribution.

The shape of the surface of the blade can be better understood by reference to Figs. 3, 4, 5 and 6. In Figs. 4 and 5 it may be seen that the surface of the blade is concave transversely with an increasing rate of curvature from the leading edge 13 to the trailing edge 15. The portion 16 of the blade adjacent to the trailing edge 15 has a small radius of curvature. Thus the portion 16 of the blade terminating in the trailing edge 15 extends forwardly from the face of the blade as regards the direction of air flow. This forwardly extending portion 16 gives the final impetus to the air to move it away from the face of the blade and in combination with the shape of the trailing edge 15 produces a component of force by its action on the air to counteract in a measure the inward momentum of the air entering the area of the fan radially and travelling across the peripheral portion of the blade. To assist in counteracting the inward momentum of the air travelling across this portion of the blade and to cause the air to travel substantially a circular path across the fan blade from the leading edge 13 to the trailing edge 15 the peripheral portion 17 of the blade extends rearwardly as regards the direction of air flow with respect to the remaining surface of the blade. Portion 17 may comprise about one-third of the radial extent of the blade surface. The line along which the peripheral portion of the blade begins to extend rearwardly is approximately the line along which the air travels that produces the maximum velocity. The angle at which the outer portion 17 extends rearwardly with respect to the remaining portion of the blade may be varied depending upon the use for which the fan is designed. For operation in free air where an unlimited amount of air may enter the fan radially, it has been found desirable in the case of fans of 10, 12 and 16 inch diameters rotating at a speed of approximately 1500 revolutions per minute to have this portion 17 of the surface extend at an angle approximately 15° to the remaining portion of the blade near the leading edge 13 of the blade and increasing to substantially 30° with respect to the remaining portion of the blade at the trailing edge 15. When it is desired to operate this fan in a restricted space such as in a duct where the output area is substantially equal to the input area and little air can enter the fan which has an inward momentum, it is not necessary or desirable to have this outer portion 17 of the surface extend rearwardly at as great an angle with respect to the remaining portion of the blade. The angle that it would extend rearwardly would depend upon the conditions under which the fan operates. For operation in a duct it is not necessary or desirable that the peripheral edge decrease in radial extent from the leading edge to the trailing edge. This is because of the decreased inward momentum of the air entering the fan. If this is done air will leave the peripheral edge intermediate the leading and trailing portions of the blade and result in increased noise of the fan. Consequently, a fan designed for open air operation will have increased noise when operated in a restricted space such as a duct, As pointed out above the shape of the trailing edge 15 and the rearwardly extending portion 17 of the outer periphery of the blade each tend to counteract the inward momentum of air traveling over the outer portion of the blade surface to permit an increase of the effective blade width, reduce the peak or maximum velocity and thus reduce the noise of operation of the fan. Each of these features, therefore, reduces the noise of operation of a fan and so it may be found satisfactory in some cases to dispense with one or the other of these features. However, I have combined the features to obtain a fan producing a minimum of noise but it is to be understood that my invention is not limited to the combination of these features. The decreasing radial extent of the peripheral edge also reduces the noise of the fan by preventing air from entering the fan intermediate the leading and trailing edges which air would travel a relatively short path as compared with the blade width and thus would be accelerated at such a rapid rate that it would produce considerable noise. Thus this feature alone reduces the noise of my fan and it is to be understood that while I have combined it with other features which assist in reducing the total noise produced by my fan it is not essential that it be so combined but it may be used to advantage without the other features.

The linear velocity of a fan blade decreases from the outer periphery of the blade to the center of the fan. Thus the velocity imparted to the air or the acceleration of the air decreases from near the outer periphery to the center of the fan. Due to other features which have been pointed out above, of course, it is not a fact that the maximum velocity imparted to the air coincides with the outer periphery of the blade. However, it is substantially true that from near the outer periphery of the blade to the center of the fan the velocity imparted to the air decreases progressively to a minimum at the center of the fan. In order to insure a positive flow at the center of rotation of the fan and also to further reduce the peak velocity near the outer periphery of the fan, the blades 11 extend forwardly as regards the direction of air flow with respect to a line perpendicular to the axis of rotation of the fan, as indicated in Figs. 2 and 6. The angle that the blade extends forwardly with respect to the line perpendicular to the axis of rotation of the fan is designated by the letter $b$ in Figs. 2 and 6. This extension forward of the blade causes air entering over that portion of the blade to flow toward the center of rotation of the fan. To further compensate for the reduced linear velocity of the blade near the center of the fan and thus increase the velocity of the air at the center of rotation, the blade is given an increasing pitch from the outer periphery toward the hub, as best indicated in Fig. 2. Referring specifically to the blade shown in the right of Fig. 1 and extending in Fig. 2 toward the observer, it will be seen, in Fig. 2, that the inner end of the blade at its point of attachment to the hub 12 is at a greater angle to the plane of rotation of the fan than the near portion or outer periphery of the blade. The amount that the blade 11 extends forward and the variation in the pitch angle from the outer periphery to the hub is determined by the conditions under which it is desired to operate the fan. It has been found that for fans of 10, 12 and 16 inch diameter rotating at a speed of substantially 1500 revolutions per minute that a satisfactory pitch variation is from 20° with respect to the plane of rotation of the fan at the outer periphery to 30° adjacent the point of connection of the blade 11 to the hub 12. The amount it has been found desirable to extend the blades forward as regards the direction of air flow with respect to a line at right angles to the axis of rotation may vary from approximately 2° at the leading edge of the blade to 10° at the trailing edge. It is to be understood that these angles are not necessarily the only desirable ones. It may be found desirable to use other angles in particular cases depending upon the speed of rotation, the fan diameter, and the housing surrounding the fan.

Referring now to Fig. 7, a curve is given of the velocity distribution of the air impelled by my improved fan at 6 inches from the fan when operating in free air. This curve was taken of a 12 inch fan of my improved construction operating at 1500 revolutions per minute. The peak velocity occurs at approximately two-thirds of the radius of the fan. While the velocity decreases from this peak at two-thirds of the radius of the fan to the center of rotation, the fan produces a substantial velocity at the center of rotation. Thus the average velocity imparted to the air between the center of rotation and the point at which the peak velocity occurs is quite high as compared with this peak velocity. Obviously to obtain the same average velocity or the same quantity of air output with a fan with a much lower velocity at the center or possibly even a negative flow of air at that point the peak velocity would have to be considerably higher. The extending forward of a blade by the angle $b$ and the increasing pitch from the outer periphery toward the hub determine the amount of velocity imparted to the air between the center of the fan, and the point of peak velocity and also serve to distribute the air so that the peak velocity is reduced and the average velocity is increased between the peak velocity and the center of rotation of the fan. It will be seen in Fig. 7 that there is a slight positive flow of air at six inches from the axis of rotation of the fan. In other words, the diameter of the column of air at six inches from the fan is equal to the diameter of the fan. Also, from the point of peak velocity to the outer diameter the average velocity is relatively high. Any increase in the diameter of the air column causes a considerable increase in the volume of air output due to the fact that the volume increases with the square of the diameter of the air column. Also, any increase in the average velocity between the peak velocity zone and the peripheral edge of the fan has a greater effect than it would have for a corresponding increase in the average velocity between the axis of rotation and the peak velocity zone because of the greater area affected at the greater radius. Also, by slightly increasing the diameter of the air column a considerable reduction may be obtained in the peak velocity for a corresponding volumetric output. The diameter of the column of air projected by the fan and the average velocity between the peak velocity and the outer periphery of the fan is determined by the shape of the trailing edge, the rearwardly extending outer portion of the blade, and the shape of the peripheral edge of the blade.

From the foregoing, it may be seen that the special form of my blade makes it possible to more efficiently utilize the surface of the blade producing a greater output of air with a given input of energy and at the same time reducing the incidental noise of the operation of the fan considerably by a decreased air acceleration and a better distribution of the air velocities from the outer periphery of the fan blade to the center of rotation.

What I claim as new and desire to secure by Letters Patent of the United States, is:—

1. In a fan, a plurality of blades, each blade having a surface with a forwardly extending trailing portion terminating in a trailing edge substantially in the form of an involute curve which extends rearwardly in the direction of rotation of the fan near the peripheral edge of the blade by an amount to balance substantially the inward momentum of the air near the outer periphery of the blade.

2. In a fan, a plurality of blades, each blade having a portion of the surface at the outer periphery extending rearwardly in the direction of air flow induced by the fan at an angle to the remaining portion of the blade, and a forwardly extending trailing portion terminating in a trailing edge substantially in the form of an involute curve to balance the inward momentum of the air near the outer periphery of the blade.

3. In a fan, a plurality of blades, each blade having a surface which is concave transversely and extends forwardly as regards the direction of air flow with respect to a line at right angles to the axis of rotation of the fan and has a forwardly extending trailing portion terminating in a trailing edge extending substantially in the form of an involute curve whereby the portion of the surface extending forwardly gives an inward impetus to the air toward the center of the fan to prevent a reverse flow of air at the axis of rotation and the forwardly extending trailing portion balances the inward momentum of the air traveling over the outer portion of the blade to increase the flow of air over that portion of the blade.

4. In a fan, a plurality of blades, each blade having a surface which is concave transversely and extends longitudinally forward as regards the direction of air flow induced by the fan with respect to a line at right angles to the axis of rotation of the fan to near the outer periphery of the blade where the surface extends rearwardly at an angle to the major portion of the blade, and a forwardly extending trailing portion terminating in a trailing edge substantially in the form of an involute curve whereby the air near the center of the fan is given an inward impetus to prevent a reverse flow of air at the axis of rotation of the fan and the outer portion of the blade counteracts the inward momentum of air traveling over the peripheral portion of the blade.

5. In a fan, a plurality of blades, each blade having a surface which is concave transversely and extends longitudinally forward as regards the direction of air flow with respect to a line at right angles to the axis of rotation of the fan to near the outer periphery of the blade where the surface extends rearwardly at an angle to the major portion of the blade, and a trailing portion terminating in a trailing edge substantially in the form of an involute curve, the surface of the blade having an increasing pitch from the outer periphery toward the center of the fan whereby the air near the center of the fan is given an inward impetus to prevent a reverse flow of air at the axis of rotation of the fan and the outer portion of the blade counteracts the inward momentum of air traveling over the peripheral portion of the blade.

6. In a fan, a plurality of blades, each blade having a surface which is concave transversely and extends longitudinally forward in the direction of movement of air induced by the fan with respect to a line at right angles to the axis of rotation of the fan to near the outer periphery of the blade where the surface extends rearwardly at an angle to the major portion of the blade, and a forwardly extending trailing portion terminating in a trailing edge substantially in the form of an involute curve, the peripheral edge of the blade having a decreasing radial extent from the leading edge to the trailing edge of the blade to eliminate the pick-up of air along the peripheral edge, whereby the air near the center of the fan is given an inward impetus to prevent a reverse flow of air at the axis of rotation of the fan and the outer surface of the blade counteracts the inward momentum of air traveling over the peripheral portion of the blade to cause the air to travel substantially the full width of the blade in an arcuate path parallel to the peripheral edge.

7. In a fan, a plurality of blades, each blade having a surface extending forwardly as regards the direction of air flow to near the outer periphery of the blade where the remaining portion of the surface of the blade extends at an angle between 15 and 30° rearwardly as regards the direction of air flow with respect to the remaining portion of the blade to counteract the inward momentum of the air traveling over the peripheral portion of the blade.

8. In a fan, a plurality of blades, each blade having a surface extending forwardly in the direction of movement of the air induced by the fan to near the outer periphery of the blade where the remaining surface of the blade extends rearwardly in the direction of air flow at an angle approximately 15° at the leading edge of the blade with respect to the inner surface of the blade to 30° at the trailing edge of the blade to counteract the inward momentum of the air traveling over the peripheral portion of the blade.

9. In a fan, a plurality of blades, each blade having a peripheral portion of the surface extending rearwardly in the direction of air flow induced by the fan at an angle to the remaining portion of the blade, the pitch of the blade decreasing from the hub toward the outer periphery, and a peripheral edge of decreasing radial extent from adjacent the leading edge to the trailing edge of the blade.

10. In a fan, a plurality of blades, each blade having a portion of the surface near the outer periphery extending rearwardly in the direction of air flow induced by the fan at an angle to the remaining portion of the blade, the inner portion of the blade extending forwardly at an angle less than 90° to the axis of the fan, and a peripheral edge of decreasing radial extent from the leading edge of the blade to the trailing edge.

11. In a fan, a plurality of blades, each blade having a portion of the surface adjacent the axis of rotation of the fan extending forwardly in the direction of air flow at an angle slightly less than 90° with respect to the axis of rotation of the fan, the outer portion of the blade extending rearwardly at an angle greater than 90° with respect to the axis of rotation of the fan, and a trailing edge curved rearwardly with respect to the direction of rotation of the fan.

12. In a fan, a plurality of blades, each blade having a portion of the surface extending forwardly with respect to the direction of air flow and another portion extending rearwardly with respect to the direction of air flow, and a peripheral edge of decreasing radial extent from the leading edge of the blade to the trailing edge.

13. In a fan, a plurality of blades, each blade having a portion of the surface adjacent the axis of rotation extending forwardly in the direction of air flow, an outer portion of the blade extending rearwardly with respect to the direction of air flow, a trailing edge extending progressively further to the rear in the direction of rotation of the fan from the hub to the outer periphery, and a peripheral edge of decreasing radial extent from the leading edge to the trailing edge of the blade.

KENTON D. McMAHAN.